(12) United States Patent
Salter et al.

(10) Patent No.: US 10,071,708 B2
(45) Date of Patent: Sep. 11, 2018

(54) CONTROLLER FOR VEHICLE WIPER SYSTEM

(71) Applicant: Ford Global Technologies, LLC, Dearborn, MI (US)

(72) Inventors: Stuart C. Salter, White Lake, MI (US); Annette Lynn Huebner, White Lake, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/432,119

(22) Filed: Feb. 14, 2017

(65) Prior Publication Data
US 2018/0229691 A1 Aug. 16, 2018

(51) Int. Cl.
*B60S 1/08* (2006.01)

(52) U.S. Cl.
CPC ............ *B60S 1/0837* (2013.01); *B60S 1/087* (2013.01); *B60S 1/0896* (2013.01)

(58) Field of Classification Search
CPC ....... B60S 1/0387; B60S 1/087; B60S 1/0896
See application file for complete search history.

(56) References Cited

U.S. PATENT DOCUMENTS

| 6,087,795 | A | 7/2000 | Amagasa et al. |
| 7,095,199 | B2 * | 8/2006 | Hirose .................. B60S 1/0818 318/2 |
| 7,466,096 | B2 * | 12/2008 | Kim ......................... B60S 1/08 318/280 |
| 8,662,685 | B2 * | 3/2014 | Sim .......................... B60R 1/07 307/10.1 |

FOREIGN PATENT DOCUMENTS

| JP | 5923749 A | 2/1984 |
| JP | 01285443 A | 11/1989 |
| JP | 01314649 A | 12/1989 |
| KR | 20020096187 A | 12/2002 |
| KR | 20090007893 A | 1/2009 |

* cited by examiner

*Primary Examiner* — Richard M Camby
(74) *Attorney, Agent, or Firm* — Jason Rogers; Price Heneveld LLP

(57) ABSTRACT

A system for a vehicle wiper is disclosed. The system comprises a first rain sensor disposed on a fore portion of a vehicle and a second rain sensor disposed on an aft portion of the vehicle. The system further comprises a controller configured to suspend a rain sensing activation identified during a monitoring cycle in response to a control event. The control even comprises detecting moisture with the first rain sensor for a delay time without detecting the moisture with the second rain sensor.

17 Claims, 4 Drawing Sheets

CONTROLLER FOR VEHICLE WIPER SYSTEM

FIELD OF THE DISCLOSURE

The present disclosure generally relates to a controller for a vehicle wiper system and more particularly relates to a controller configured to suspend operation of a vehicle wiper system.

BACKGROUND OF THE DISCLOSURE

Wiper systems for vehicles may include one or more moving components configured to slide over various surfaces (e.g. a window, windshield, headlight, etc.) of a vehicle. Such operation may result in damage to the one or more moving components in certain situations. For example, a wiper system may be damaged as a result of operation during a washing process of the vehicle. Accordingly, the present disclosure provides for a vehicle wiper system comprising a controller configured to improve operation of the wiper system.

SUMMARY OF THE DISCLOSURE

According to one aspect of the present disclosure, a system for a vehicle wiper is disclosed. The system comprises a first rain sensor disposed on a fore portion of a vehicle and a second rain sensor disposed on an aft portion of the vehicle. The system further comprises a controller configured to suspend a rain sensing activation identified during a monitoring cycle in response to a control event. The control even comprises detecting moisture with the first rain sensor for a delay time without detecting the moisture with the second rain sensor.

According to another aspect of the present disclosure, a method for controlling an automatic rain sensing activation for a vehicle wiper is disclosed. The method comprises detecting a plurality of control events comprising a vehicle speed less than a predetermined speed and detecting moisture with the first rain sensor for a delay time without detecting the moisture with the second rain sensor. In response to the plurality of control events identified during a monitoring cycle, suspending the activation of the vehicle wiper.

According to yet another aspect of the present disclosure, a system for a vehicle wiper comprising a first rain sensor disposed on a fore portion of a vehicle and a second rain sensor disposed on an aft portion of the vehicle. The system further comprising an ambient light sensor configured to detect a light level of an environment proximate the vehicle. A controller is in communication with a speed sensor configured to communicate a vehicle speed. The controller is configured to suspend a rain sensing activation identified during a monitoring cycle in response to a plurality of control events. The control events comprise detecting the vehicle speed less than a predetermined speed, detecting moisture with the first rain sensor for a delay time without detecting the moisture with the second rain sensor, and detecting a change in the light level exceeding a predetermined light change threshold.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
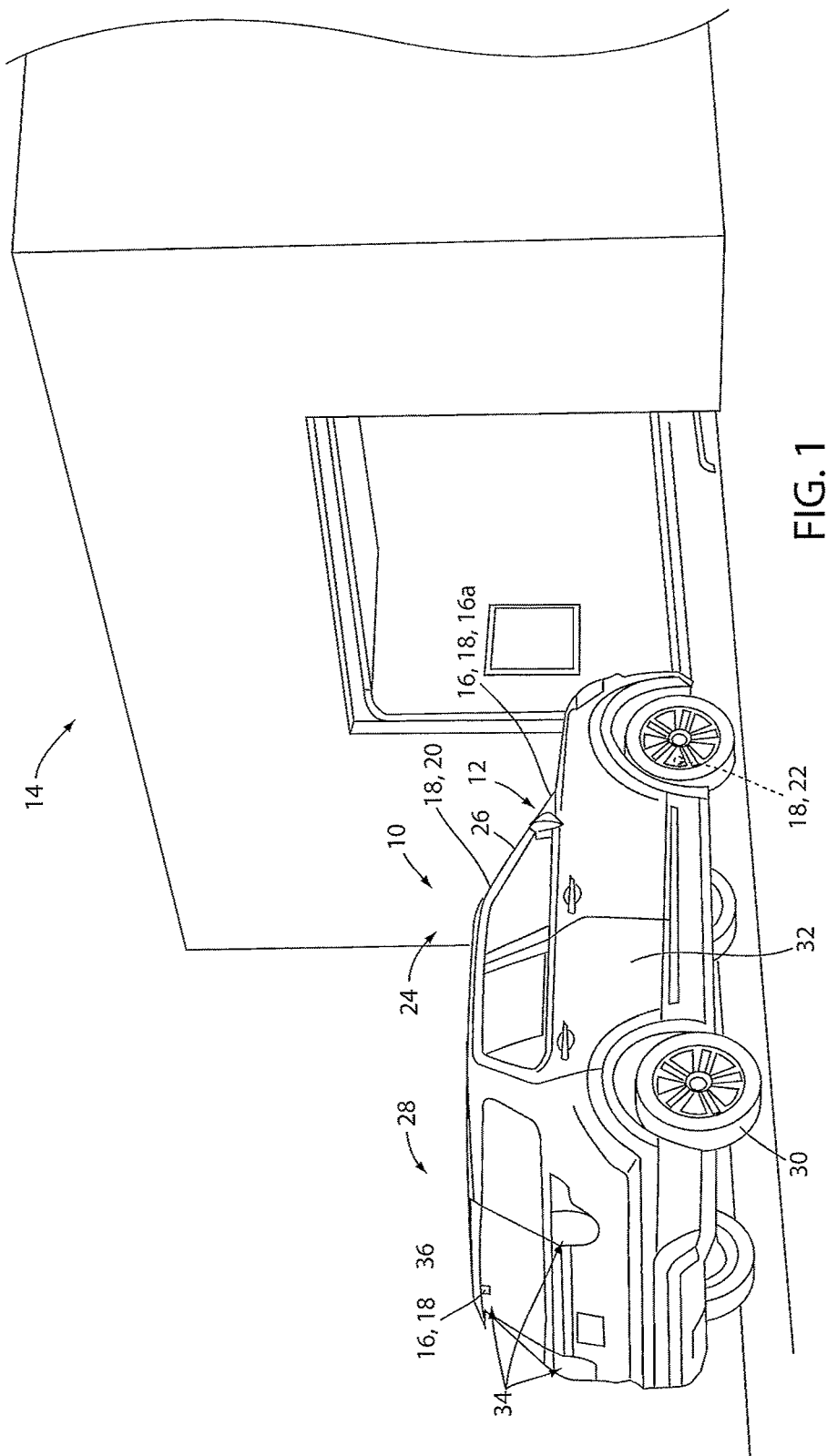
FIG. 1 is an environmental view of a vehicle comprising a wiper system entering a vehicle wash.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring to FIG. 1, an environmental view of a vehicle 10 comprising a wiper system 12 is shown. As demonstrated in FIG. 1, the vehicle 10 is shown entering a vehicle wash 14. The vehicle wash 14 may correspond to an enclosed building or area comprising one or more automatic vehicle washing systems or devices. In an exemplary embodiment, the wiper system 12 corresponds to an automatic wiper system configured to activate one or more moving components in response to a detection of moisture or rain detected by at least one rain sensor 16. However, upon entering the vehicle wash 14, the wiper system 12 may be susceptible to damage to one or more moving components. Accordingly, the disclosure may provide for various embodiments of the wiper system 12 configured to temporarily suspend the operation of the automatic or rain sensing activation of the wiper system 12 to prevent damage that may result from activation of the one or more moving components while the vehicle 10 is being washed by the vehicle wash 14.

The one or more moving components of the wiper system 12 may comprise control arms, wiper blades, wiper motors, and various elements of vehicle wiper systems that may be exposed to brushes and/or jets while the vehicle 10 is being cleaned in the vehicle wash 14. In order to identify that the vehicle 10 has entered the vehicle wash 14 or is being processed or cleaned within the vehicle wash 14, the wiper system 12 may be configured to detect conditions and other factors that may indicate that the vehicle 10 is entering or being processed within the vehicle wash 14. To detect such conditions, the wiper system 12 may be in communication with a plurality of sensors 18. By monitoring various signals communicated from the sensors 18, the wiper system 12 may infer that the vehicle 10 is being processed in the vehicle wash 14 and suspend operation of the automatic or rain sensing wiper functions of the wiper system 12.

The sensors 18 of the wiper system 12 may comprise the at least one rain sensor 16, a light sensor 20 (e.g. an ambient light sensor), and/or a vehicle speed sensor 22. In an exemplary embodiment, the wiper system 12 may comprise a first rain sensor 16a and a second rain sensor 16b. The first rain sensor 16a may be disposed on a fore portion 24 of the vehicle 10, which may be located proximate to or forward from a front windshield 26 of the vehicle 10. The second rain sensor 16b may be disposed on an aft portion 28 of the vehicle 10. The aft portion 28 may correspond to a portion of the vehicle located rearward from or behind rear wheel 30 or rear door 32 of the vehicle 10. In some embodiments, the second rain sensor 16b may be incorporated as a portion of an indicator light 34, for example a center high mount stop light (CHMSL) 36 of the vehicle 10. In this configuration, the wiper system 12 may be configured to identify conditions indicating that the vehicle 10 has entered or is being processed within the vehicle wash 14 and temporarily disable or suspend an automatic or rain sensor wiper control function of the wiper system 12.

Figure 2:
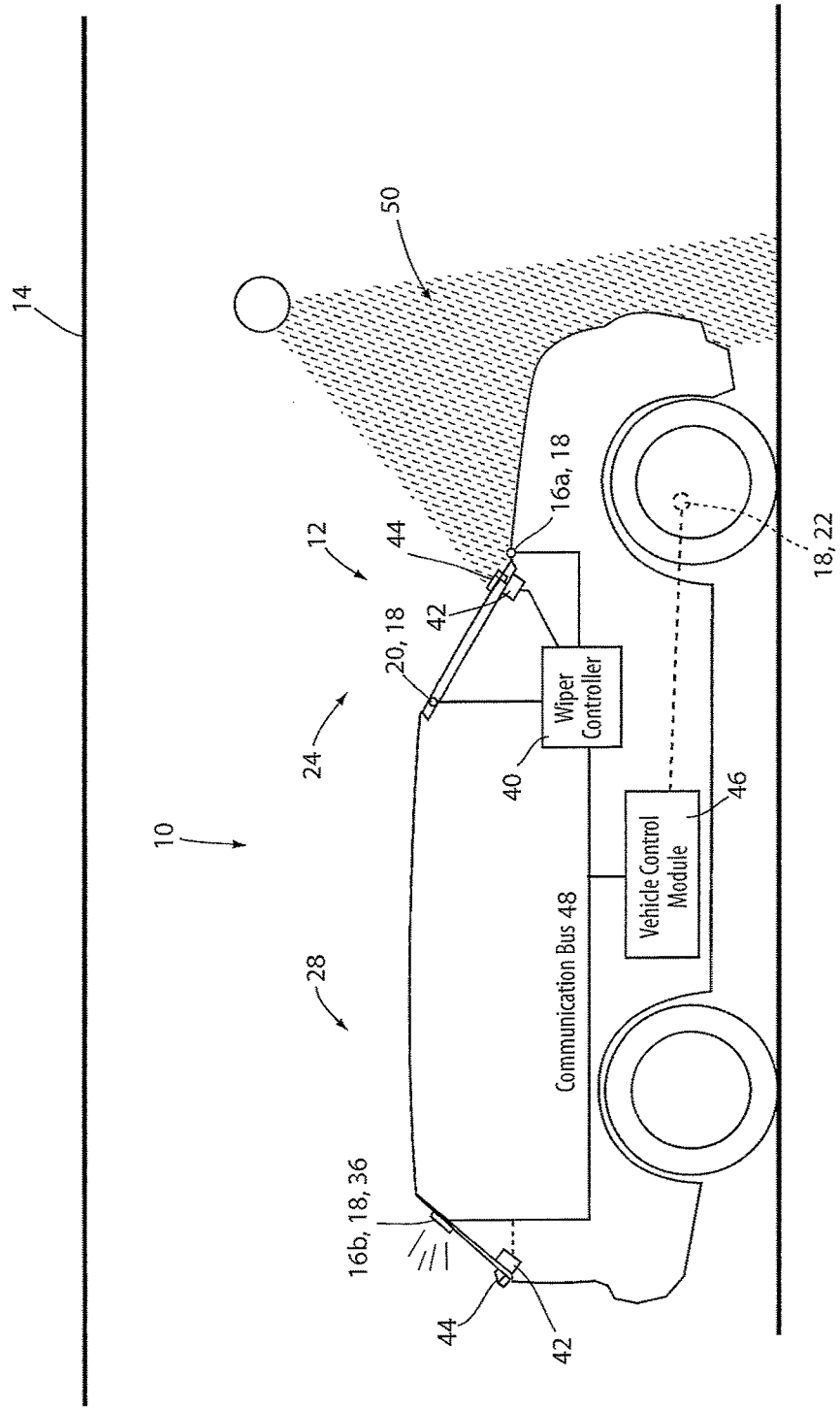
FIG. 2 is a side schematic view of a vehicle comprising a wiper system demonstrating a wiper controller.

Referring now to FIG. 2, a side schematic of the vehicle 10 demonstrating the wiper system 12 is shown. As previously discussed, the wiper system 12 may be operable to detect conditions indicating that the vehicle 10 is being processed or located within the vehicle wash 14. Such conditions may be identified by monitoring the sensors 18 in communication with the wiper system 12. In some embodiments, the wipers system 12 may be configured to identify a specific order of conditions or triggering events identified by the sensors 18 in order to improve one or more inferences indicating that the vehicle is located within or being processed within the vehicle wash 14. Accordingly, the specific order of the triggering events or conditions identified by the sensors 18 may be discussed and/or presented in a specific order. However, this order may not be considered to limit the scope of the claims unless specifically recited.

As demonstrated in FIG. 2, the wiper system 12 may comprise a wiper controller 40. The wiper controller 40 may comprise one or more processors, circuits, memory, utilities, and/or operating modules configured to provide for the detection and functionality discussed herein. Further detailed description regarding the wiper system 12 and the wiper controller 40 is provided in reference to FIG. 4. The wiper controller 40 may be in communication with at least one wiper motor 42, which may be configured to engage and control the motion of one or more wiper blades 44, connecting arms, or linkages. The wiper controller 40 may further be in communication with a vehicle control module 46 via a communication bus 48. In this configuration, the wiper controller 40 may be configured to receive an indication or vehicle speed from the speed sensor 22 via the communication bus 48. Though specific communication interfaces and methods are discussed in reference to the wiper controller 40, the wiper motor 42, and the sensors 18; such exemplary interfaces shall not be considered limiting to the scope of the disclosure.

The wiper controller 40 is further shown in FIG. 2 in communication with the first rain sensor 16a, the second rain sensor 16b, and the light sensor 20. As previously discussed, the second rain sensor 16b may be incorporated within or form an integral portion of the CHMSL 36. In such embodiments, the second rain sensor 16b may be in communication with the wiper controller 40 via the communication bus 48.

As described herein, the wiper controller 40 may utilize signals or information communicated from one or more of the sensors 18 and any combination as discussed herein to provide for the beneficial functionality of the wiper system 12.

In an exemplary embodiment, the wiper controller 40 may monitor the vehicle speed sensor 22 and the light sensor 20 as factors that may be utilized to suspend rain sensing wiper operation. For example, the wiper controller 40 may enter a wiper suspension control routine in response to the vehicle speed being below a speed threshold communicated from the speed sensor 22. Suspension of the automatic wiper activation may further be controlled in response to a change in a light level communicated from the light sensor 20 exceeding a light change threshold. The speed threshold of the vehicle may be approximately less than 4 kph and may indicate that the vehicle is traveling slowly within the vehicle wash 14. The change in the light level exceeding the light change threshold may indicate a significant change in an ambient light level outside the vehicle wash 14 indicated by the light level changing due to the vehicle 10 entering the vehicle wash 14. Accordingly, the wiper system 12 may monitor the speed of the vehicle 10 and ambient light conditions of the environment surrounding the vehicle 10 as indicators, which may contribute to a resulting operation suspending automatic or rain sensing functionality of the system 12.

The wiper system 12 may further monitor each of the rain sensors 16a, 16b to further support the inference that the vehicle 10 has entered the vehicle wash 14. For example, if water 50 or moisture is detected by the first rain sensor 16a but not by the second rain sensor 16b, the wiper system 12 may initialize or suspend automatic or rain sensing operation of the wiper system 12. In an exemplary embodiment, the wiper system 12 may delay the activation of the wiper system 12 in response to a detection of the water 50 by the first rain sensor 16a for a predetermined time period. The predetermined time period may extend from the first detection of the water 50 or similar fluid by the first rain sensor 16a to a second detection of the water 50 by the second rain sensor 16b.

Additionally, the delayed activation of the wiper system 12 or suppression of the activation may only be applied by the wiper controller 40 if the vehicle speed is below the speed threshold. In this way, the wiper system 12 may further identify conditions that may correspond to the vehicle 10 being processed within the vehicle wash 14. More specifically, the delayed activation or suppression of the wiper system 12 may be determined in response to the wiper controller 40 identifying the vehicle speed below the speed threshold in combination with the first rain sensor 16a detecting the water 50 while the second rain sensor 16b does not detect the water 50. This combination of conditions may indicate that the vehicle 10 is being processed in the vehicle wash 14. Accordingly, the wiper system 12 may suppress the activation of the automatic or rain sensing wiper system to prevent damage.

Figure 3:
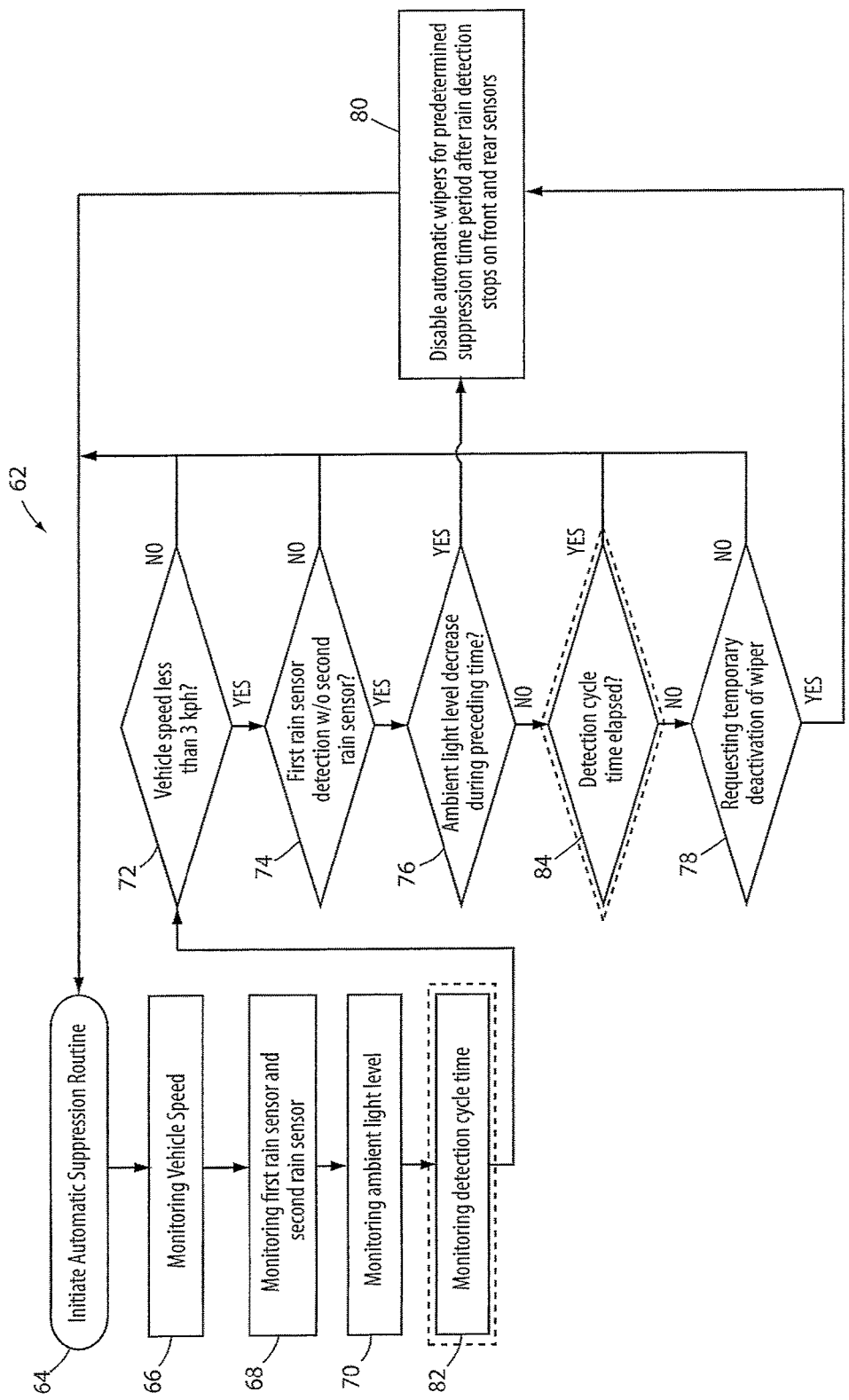
FIG. 3 is a block diagram demonstrating a method for suspending an automatic or rain sensing wiper control.

Referring now to FIG. 3, a flow chart demonstrating a method 62 configured to suppress the automatic activation of the wiper system 12 is shown. The method 62 may begin in response to the activation of the vehicle 10 and/or the activation of the automatic or rain sensing function of the wiper system 12. In response to the activation of the automatic functionality of the wiper system 12, the method 62 may initiate an automatic wiper suppression routine (64). As discussed herein, the wiper suppression routine may temporarily disable or suppress the activation of an automatic or rain sensing wiper function in response to the detection of the conditions indicating that the vehicle 10 has entered or is being processed within the vehicle wash 14.

The method 62 may include various monitoring steps, which may comprise the wiper controller 40 monitoring signals supplied from the sensors 18. For example, the wiper controller 40 may monitor the vehicle speed communicated from the speed sensor 22 (66). Additionally, the wiper controller 40 may monitor the first rain sensor 16*a* and the second rain sensor 16*b* to detect moisture accumulating or striking the vehicle 10 over the fore portion 24 and the aft portion 28 respectively (68). Finally, in some embodiments, the wiper controller 40 may monitor the ambient light level communicated by the light sensor 20 (70).

With the information communicated from the sensors 18, the method 62 may continue to compare the information provided from the sensors to various thresholds. In response to a combination of inputs from the sensors 18, the wiper controller 40 may be operable to accurately infer that the vehicle 10 has entered and/or is being processed within the vehicle wash 14. For example, in step 72, the wiper controller 40 may monitor the vehicle speed as communicated from the speed sensor 22 to identify if the speed of the vehicle 10 exceeds a speed threshold. If the speed of the vehicle 10 exceeds the speed threshold, the method 62 may return to step 64. If the speed of the vehicle 10 does not exceed the speed threshold in step 72, the method 62 may continue to monitor the additional sensors 18. The speed threshold of the vehicle 10 may correspond to a speed typical under normal operating conditions of the vehicle wash 14. For example, the speed threshold may be approximately 4 kph in some embodiments. In various embodiments, the speed threshold may be 3 kph or even as low as 2 kph depending on the desired operation of the wiper controller 40.

In step 74, the wiper controller 40 may monitor detection signals from each of the first rain sensor 16*a* and the second rain sensor 16*b*. As previously discussed, the wiper controller 40 may monitor the rain sensors 16 to determine if the first rain sensor 16*a* detects moisture or liquid accumulation for a predetermined delay time without receiving an indication of a rain detection from the second rain sensor 16*b*. The predetermined delay time may correspond to an expected time period required for a length of the vehicle 10 extending from the first rain sensor 16*a* to the second rain sensor 16*b* to travel through the vehicle wash 14. For example, the predetermined delay time may vary from approximately 5 seconds to approximately 25 depending on the length of the vehicle 10 between the rain sensors 16*a*, 16*b*. Additionally, if the speed of the vehicle 10 is maintained below the speed threshold from step 72, the wiper controller 40 may temporarily suspend automatic or rain sensing wiper activation throughout step 74. In this way, the wiper controller 40 may be operable to prevent the activation of the rain sensing or automatic operation of the wiper system 12 as the vehicle 10 enters and passes through the vehicle wash 14.

In step 76, the wiper controller 40 may monitor the ambient light level communicated from the light sensor 20. For example, the wiper controller 40 may monitor the light level to determine if a change in the light level exceeds a predetermined light change threshold. If the wiper controller 40 identifies a change in the light level communicated from the light sensor 20 exceeding the light change threshold, the method 62 may continue to step 80 to disable an automatic or rain sensing function of the wiper system 12. In step 76, if the wiper controller 40 determines that a change in the light level does not exceed the light change threshold, the method 62 may continue to step 78. The light change threshold may correspond to a change in light level that may typically correspond to a change from a natural light level outside the vehicle wash 14 to an artificial light level inside the vehicle wash 14. For example, the light level corresponding to direct sunlight may vary from approximately 10,000 to 100,000 $CD/M^2$. Additionally, the light level for artificial light inside the vehicle wash 14 may vary from approximately 500 to 5,000 $cd/m^2$. Accordingly, the light change threshold may vary from approximately 5,000 to 90,000 $cd/m^2$ depending on typical operating conditions and the desired operation of the wiper system 12.

In step 78, the wiper controller 40 may output a prompt to a user interface within the vehicle 10 requesting temporary deactivation of an automatic function of the wiper system 12. In response to the prompt indicated on the user interface, an operator or passenger of the vehicle 10 may select whether or not to temporarily deactivate automatic functionality of the wiper system 12. If in step 78, deactivation is not selected, the method 62 may return to step 64 to continue the method 62. If in step 78 an input to the user interface indicates that deactivation of an automatic function of the wiper system 12 is desired, the method 62 may continue to step 80.

In step 80, the wiper controller 40 may disable a rain sensing or automatic wiper function for a predetermined time period. The predetermined time period may be referred to as a suppression time period, which may begin after a rain or moisture detection identified by each of the first rain sensor 16*a* and the second rain sensor 16*b* has stopped. Following the end of the detection by the rain sensors 16, the suppression time may continue for a predetermined time period, which may vary from approximately 30 seconds to more than 2 minutes depending on a desired operation of the wiper system 12. Accordingly, the method 62 may provide for the suppression of a rain sensing or automatic wiper function of the wiper system 12, which may prevent damage to the wiper system 12 due to the vehicle wash 14.

In some embodiments, the method 62 may further limit a time period or the suppression routine to a predetermined detection cycle time. For example, following step 70 the wiper controller 40 may further initialize and monitor a detection cycle time (82). The detection cycle time may correspond to a time period during which one or more of the conditions or triggering events described in step 72, 74, and 76 must occur in order to automatically suppress automatic wiper operation of the wiper system 12 in step 80. Accordingly, following step 76, the wiper controller 40 may determine if the detection cycle time has elapsed (84). If the detection cycle time has elapsed, the method 62 may return to step 64. If the detection cycle time has not elapsed, the method 62 may continue to step 78. The detection cycle time may correspond to a time limit or maximum time during which a combination of the events outlined and discussed in reference to step 72, 74, and 76 are expected to occur under typical operating conditions of the vehicle wash 14. For example, the detection cycle time may be as low as 1 minute in some instances and greater than 3 or 4 minutes in other embodiments depending on the desired operation of the wiper system 12.

Figure 4:
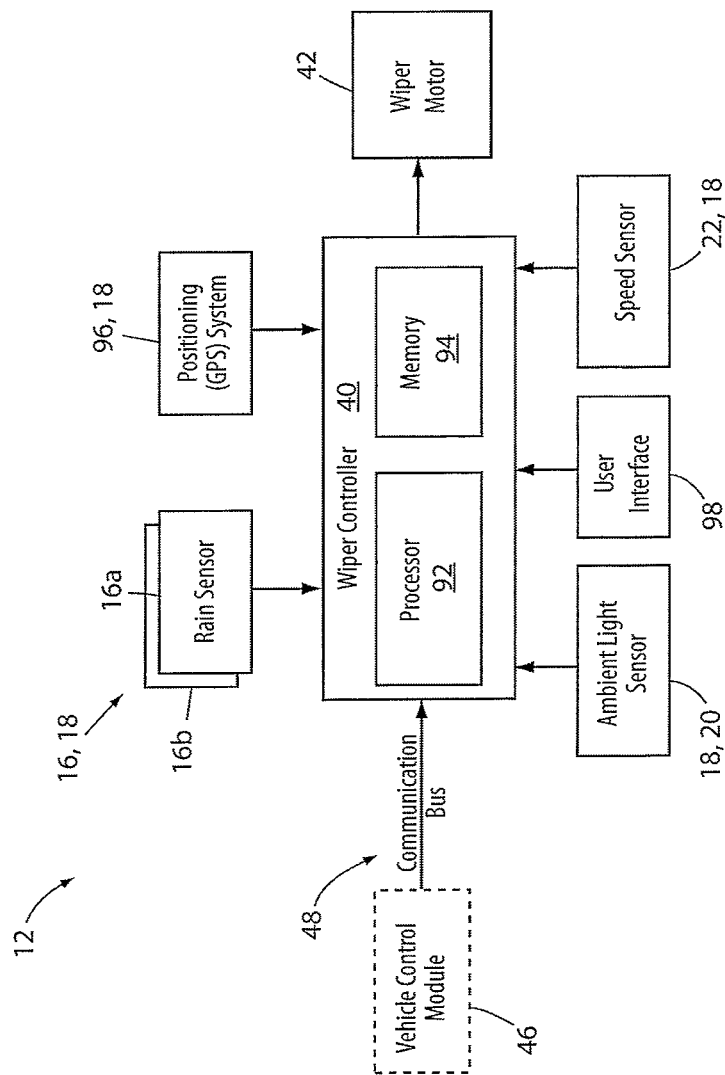
FIG. 4 is a flow chart demonstrating a wiper system in accordance with the disclosure.

Referring now to FIG. 4, a block diagram demonstrating the wiper system 12 is shown. The wiper system 12 may comprise the wiper controller 40. The wiper controller 40 may further comprise a processor 92 and memory 94. The processor 92 may correspond to one or more circuits, processors, microprocessors, application specific integrated circuits (ASICs) or various other control circuits. The memory 94 may correspond to volatile (e.g. random access memory (RAM)), non-volatile (e.g. read-only memory (ROM)), flash memory, and/or any combination thereof. In this configuration, the wiper controller 40 may provide for the various operations and routines discussed herein.

The wiper controller 40 is in communication with the plurality of sensors 18. As previously discussed, the plurality of sensors 18 may comprise the rain sensors 16, the ambient light sensor 20, the speed sensor 22, and additionally may include a navigation or global positioning (GPS) sensor 96. The rain sensors 16 may correspond to infrared rain sensors or various other forms of rain sensors that may be utilized to detect moisture accumulation on the vehicle 10. The ambient light sensor 20 may correspond to a photodetector which may correspond to a photoemission sensor, a photoelectric sensor, photovoltaic sensor, photochemical sensor or other similar sensors. The speed sensor 22 may correspond to a rotary speed sensor incorporated in an engine or transmission of the vehicle 10 which may be in communication with the wiper controller 40 via the communication bus 48. In this configuration, the wiper controller 40 may monitor signals from each of the sensors 18 to identify or infer that the vehicle 10 has entered or is being processed within the vehicle wash 14.

In some embodiments, the wiper controller 40 may further utilize the GPS system 96 to identify information regarding the location of the vehicle 10. Such information may be used in combination with the various steps discussed in the method 62 and throughout the disclosure to identify if the vehicle 10 is located at the vehicle wash 14. In some embodiments, location data from the GPS system 96 may indicate to the wiper controller 40 that the vehicle 10 is located within or proximate to the vehicle wash 14. Under such circumstances, the wiper controller 40 may suppress automatic or rain sensing operation of the wiper system 12 in response to one or more sensory indications from the rain sensor 16, the ambient light sensor 20, and/or the speed sensor 22. Accordingly, the disclosure may provide for a variety of methods and control techniques that may suppress an activation of an automatic rain sensing wiper system in response to various conditions that may suggest or indicate that the vehicle 10 is located or being processed within the vehicle wash 14.

In some embodiments, the wiper controller 40 may further be in communication with a user interface 98 disposed within the vehicle 10. The user interface 98 may comprise a display screen configured to display a prompt requesting temporary deactivation of an automatic function of the wiper system 12. The display may correspond to various forms of display screen (e.g. a liquid crystal display (LCD), light emitting diode (LED) display, etc.). In some embodiments, the display screen comprise one or more switches or a touch interface (e.g. a capacitive, resistive, surface acoustic wave, etc.) configured to receive an input. In response to the prompt indicated on the user interface 98, an operator or passenger of the vehicle 10 may select whether or not to temporarily deactivate automatic functionality of the wiper system 12.

It is to be understood that variations and modifications can be made on the aforementioned structure without departing from the concepts of the present disclosure, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A system for a vehicle wiper comprising:
    a first rain sensor disposed on a fore portion of a vehicle;
    a second rain sensor disposed on an aft portion of the vehicle;
    an ambient light sensor configured to detect a light level of an environment proximate the vehicle; and
    a controller configured to suspend a rain sensing activation identified during a monitoring cycle in response to a control event comprising:
        detecting moisture with the first rain sensor for a delay time without detecting the moisture with the second rain sensor; and
        detecting a change in the light level exceeding a predetermined light change threshold during the monitoring cycle.

2. The system according to claim 1, wherein the controller is in communication with a vehicle speed sensor.

3. The system according to claim 2, wherein the controller is further operable to suspend the rain sensing activation in response to:
    detecting the vehicle speed less than 3 kph during the monitoring cycle.

4. The system according to claim 1, wherein the monitoring cycle corresponds to a predetermined time period during which each of the control events identified by the controller take place to suspend the rain sensing activation.

5. The system according to claim 1, wherein the controller is in communication with an interface configured to receive an input and display a prompt.

6. The system according to claim 5, wherein the controller is configured to display the prompt requesting the suspension of the rain sensing activation in response to at least one of the following:
   detecting the vehicle speed less than 3 kph during the monitoring cycle;
   detecting moisture with the first rain sensor for the delay time without detecting the moisture with the second rain sensor; and
   detecting a change in the light level exceeding a predetermined light change threshold during the monitoring cycle.

7. The system according to claim 1, wherein suspending the rain sensing activation comprises disabling an automatic activation of the wiper for a deactivation time following the first rain sensor and the second rain sensor indicating that no moisture is detected for a dry time period.

8. The system according to claim 1, wherein the first rain sensor is disposed proximate a front windshield and the second rain sensor is disposed proximate a rear windshield.

9. The system according to claim 1, wherein the second rain sensor is in communication with a circuit for a rear center high mount stop light disposed proximate the rear windshield.

10. A method for controlling an automatic rain sensing activation for a vehicle wiper comprising:
    detecting during a monitoring cycle a plurality of control events comprising:
       moisture detected with a first rain sensor for a delay time without detecting the moisture with a second rain sensor; and
       a change in a light level exceeding a predetermined light change threshold; and
    in response to the control events identified during the monitoring cycle, suspending the activation.

11. The method according to claim 10, further comprising:
    displaying a prompt requesting the suspension of the rain sensing activation in response to at least two of the control events occurring during the monitoring cycle.

12. The method according to claim 11, wherein the control events further comprise:
    receiving an input requesting the suspension of the rain sensing activation in response to the prompt.

13. The method according to claim 10, wherein the monitoring cycle corresponds to a predetermined time period during which each of the control events identified by the controller take place to suspend the rain sensing activation.

14. The method according to claim 10, wherein suspending the rain sensing activation comprises disabling an automatic activation of the wiper for a deactivation time following the first rain sensor and the second rain sensor indicating that no moisture is detected for a dry time period.

15. A system for a vehicle wiper comprising:
    a first rain sensor disposed on a fore portion of a vehicle;
    a second rain sensor disposed on an aft portion of the vehicle;
    an ambient light sensor configured to detect a light level of an environment proximate the vehicle; and
    a controller in communication with a speed sensor configured to communicate a vehicle speed, wherein the controller is configured to suspend a rain sensing activation identified during a monitoring cycle in response to:
       detecting the vehicle speed less than a predetermined speed;
       detecting moisture with the first rain sensor for a delay time without detecting the moisture with the second rain sensor; and
       detecting a change in the light level exceeding a predetermined light change threshold.

16. The system according to claim 15, wherein the controller is in communication with an interface configured to receive an input and display a prompt.

17. The system according to claim 16, wherein the controller is configured to display the prompt requesting the suspension of the rain sensing activation in response to:
    detecting the vehicle speed less than 3 kph during the monitoring cycle; and detecting moisture with the first rain sensor for the delay time without detecting the moisture with the second rain sensor.

* * * * *